(12) United States Patent
Sharma (10) Patent No.: US 8,135,836 B2
(45) Date of Patent: Mar. 13, 2012

(54) TIE RESOLUTION IN APPLICATION LOAD LEVEL BALANCING

(75) Inventor: Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 1346 days.

(21) Appl. No.: 11/290,227

(22) Filed: Nov. 30, 2005

(65) Prior Publication Data

US 2007/0124431 A1  May 31, 2007

(51) Int. Cl.
*G06F 15/173* (2006.01)
*G06F 15/16* (2006.01)
(52) U.S. Cl. ......... 709/226; 709/227; 709/228; 709/229
(58) Field of Classification Search ............ 709/226
See application file for complete search history.

(56) References Cited

U.S. PATENT DOCUMENTS

| | | | |
|---|---|---|---|
| 6,442,139 B1 * | 8/2002 | Hosein | 370/236 |
| 6,950,849 B1 * | 9/2005 | Brandstatter | 709/203 |
| 7,062,556 B1 * | 6/2006 | Chen et al. | 709/226 |
| 7,768,909 B1 * | 8/2010 | Parlamas et al. | 370/229 |
| 2002/0049842 A1 * | 4/2002 | Huetsch et al. | 709/225 |
| 2002/0188663 A1 * | 12/2002 | Islam et al. | 709/202 |
| 2002/0188713 A1 * | 12/2002 | Bloch et al. | 709/223 |
| 2002/0194336 A1 * | 12/2002 | Kett et al. | 709/225 |
| 2004/0024861 A1 * | 2/2004 | Coughlin | 709/224 |
| 2005/0102676 A1 * | 5/2005 | Forrester | 718/105 |
| 2005/0269394 A1 * | 12/2005 | Ozer | 235/375 |
| 2006/0069780 A1 * | 3/2006 | Batni et al. | 709/226 |
| 2006/0179150 A1 * | 8/2006 | Farley et al. | 709/228 |

* cited by examiner

*Primary Examiner* — Jeffrey Pwu
*Assistant Examiner* — Shaq Taha
(74) *Attorney, Agent, or Firm* — Carmen Patti Law Group, LLC (57) ABSTRACT

In a network such as a cellular telephone communications network, a control server balancing processing loads among several resource servers resolves a tie between resource servers using the resource servers' prior, current and future load state data and call gap percentages in each of the prior, current and future load states. Such tie resolution also takes into account the trend of resource demands placed on the network; whether it is monotonically increasing, monotonically decreasing or indeterminate. The goal of such resolution is to maximize the throughput of the network while eliminating random selection of resource servers to service requests.

20 Claims, 5 Drawing Sheets

TIE RESOLUTION IN APPLICATION LOAD LEVEL BALANCING

CROSS-REFERENCE TO RELATED APPLICATIONS

This application contains subject matter that is related to the subject matter of the following applications, which are assigned to the same assignee as this application. The teachings of the applications listed below are hereby incorporated herein by reference in their entireties:

"SCHEDULED DETERMINATION OF NETWORK RESOURCE AVAILABILITY," by Ramachendra P. Batni, Chen Fan, Ranjan Sharma, and Yu Jun Zhu, Ser. No. 10/954,573, filed Sep. 30, 2004.

"CONTROL SERVER THAT MANAGES RESOURCE SERVERS FOR SELECTED BALANCE OF LOAD," by Ramachendra P. Batni and Ranjan Sharma, Ser. No. 11/171,077, co-filed herewith.

"CONTROL SERVER EMPLOYMENT OF OFFER MESSAGE FROM RESOURCE SERVER TO DETERMINE WHETHER TO ADD INDICATION OF THE RESOURCE SERVER TO RESOURCE SERVER MAPPING TABLE," by Ramachendra P. Batni, Hai Bin Luo, and Ranjan Sharma, Ser. No. 11/173,966 filed on Jun. 30, 2005.

"APPLICATION LOAD LEVEL DETERMINATION," by Ramachendra P. Batni, John R. Beasley, Robert Brunetti, Brian P. Davis, Chen Fan, Nickolas Landsberg, and Ranj an Sharma, Ser. No. 11/173,412, filed on Jun. 30, 2005.

TECHNICAL FIELD

The invention disclosed and claimed herein relates generally to the management of networks of computers and switching networks. More particularly, this invention relates to the management and distribution of processing tasks by a primary or control server among two or more secondary servers in a network.

BACKGROUND

In the prior art, a configuration of distributed servers in a network comprises a control server and a two or more resource servers that are coupled to the control server. The control server assigns or allocates processing tasks to the resource servers, which then perform the task.

Each processing task requires each resource server to which it is assigned, to process or handle the task for, or on behalf of, the network. In a telecommunications network, a processing task that a resource server would perform includes the processing of incoming telephone or cellular telephone calls.

To prevent a single resource server, such as an application server in a cellular communications network, from becoming overloaded and thereafter delaying or denying call attempts by customers or even worse, dropping calls in progress, the control server performs processing load balancing by which it attempts to evenly distribute the processing loads among the various resource servers.

Prior art methods exist for load balancing, but regardless of how load balancing is performed, a load balancing problem can arise when two or more resource servers appear to the control server to be equally suited (or unsuited) to accept additional data processing loading. Deciding which of two or more servers a new load should be sent to requires tie breaking between two or more resource servers that appear to be equally able or unable to handle an additional processing task.

Prior art tie resolution methods consider a resource server's base line or normal loading. In a telecommunications network, prior art tie resolution considered calls-in-progress or CIP; current overload state and call gap percentage in the current overload state but when resolving ties, they do not consider the overall performance of the network.

The terms and concepts of "call gap," "call gapping" and "call gapping percentage" used through-out this disclosure, are explained in the applicant's co-pending U.S. patent application having Ser. No. 11/173,412 and entitled, "APPLICATION LOAD LEVEL DETERMINATION" and which was filed on Jun. 30, 2005. The teachings of application Ser. No. 11/173,412 regarding the concepts and meanings of terms of "call gap," "call gapping" and "call gapping percentage" are incorporated herein by reference.

The terms and concepts of "normal load" state/condition, "overload" and "overload state" used through-out this disclosure are explained in the applicants co-pending U.S. patent application having Ser. No. 11/171,077 and entitled "CONTROL SERVER THAT MANAGES RESOURCE SERVERS FOR SELECTED BALANCE OF LOAD" which was filed on Jun. 30, 2005. The teachings of application Ser. No. 11/171,077 regarding the concepts and meanings of normal load state or condition, "overload" and "overload state" are hereby incorporated herein by reference.

Prior art tie resolution methods do not always properly allocate a new processing load between two or more apparently-equally qualified servers because the servers might not, for various reasons be equally appropriate for assigning new load tasks to them nor do prior art methods consider network performance overall. Since it's well known that the quality of service (QoS) in a network is affected by the computers/servers of a network that control and operate network equipment, in order to maintain service levels in a network, a need exists for a method of resolving ties between resource servers whereby a control server can assign a new processing load to the resource server best suited to handle the load for the best overall operation of a communications system or network.

SUMMARY

In a network of computers, at least one of which is a control server that assigns processing tasks to two or more other resource computers or servers, there is provided a method for a control server to resolve an uncertainty or "tie" in the determination of which of two or more resource servers should be assigned an additional processing task by the control server based on maximizing overall network performance. In a communications network, such as a cellular telephone network, the tie resolution method considers each resource servers' current normal state load or its current overload state and if a server is in an overload state, the method considers overload state call gap percentages; the servers' next overload states and the call gap percentage that will exist in each resource servers' next overload state; the resource servers' previous overload states and their previous overload states' call gap percentages. If, however, resource server tie resolution requires choosing between two or more servers in their normal load condition, the server that can handle the largest amount of requests at present, before going into overload mode, is considered for next task assignment. If this requires a tie resolution, then the servers' first overload state and the call gap percentages are considered before choosing the server. The method also considers call volume trends in deciding which server should be assigned a new processing task. Processing tasks are assigned to resource servers to maximize the quality of service provided by the communications network. To that end, processing tasks are assigned to resource servers in order to maximize network performance and not to maximize an individual server's performance.

DESCRIPTION OF THE DRAWINGS

Features of exemplary implementations of the invention will become apparent from the description, the claims, and the accompanying drawings in which:

DETAILED DESCRIPTION

Figure 1:
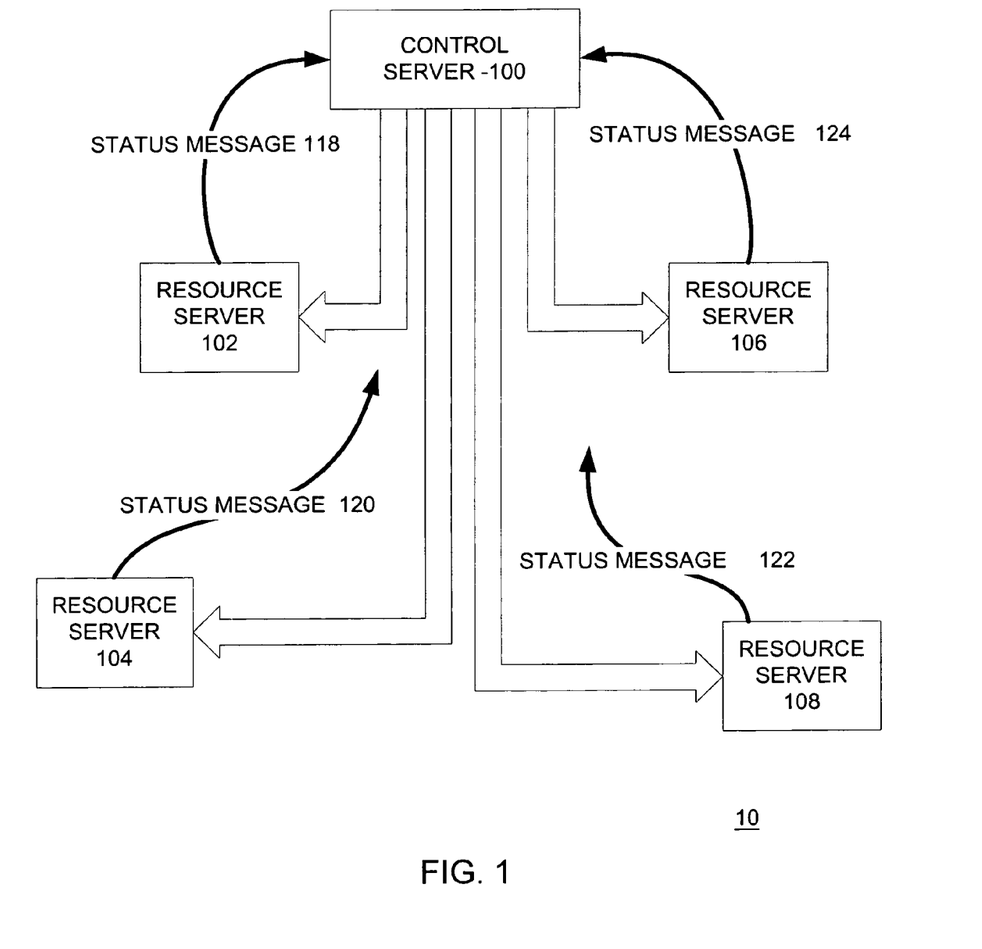
FIG. 1 is a diagram of a network of servers such as the servers used in a wireless communications network.

Turning to FIG. 1 there is depicted a network 10 of interconnected computers, also known as servers, such as those used in a wireless communication system, an asynchronous transfer mode network which carries IP data packets or a synchronously switched telephony network. FIG. 1 can also be considered to be a depiction of several different processors in a data processing system, such as bank, an airline reservation system or one that might be used in parallel processing or in a general purpose mainframe computer wherein several processors or CPUs are sent or allocated data or information to process or which are assigned separate and discrete processing tasks to perform, by a controlling CPU or by a job supervisory program. For brevity, the concepts of a processing a task, processing data and processing information are considered herein to be equivalent and such terms may be used interchangeably hereinafter. All sh concepts and terms are also considered to be within the scope of the claims set forth hereinafter.

In FIG. 1, a primary or lead computer, referred to herein as a master or control server 100, is operatively coupled to several other secondary computers that are referred to herein as resource servers 102, 104, 106 and 108 and which those of ordinary skill in the art might also refer to as "back-end" servers. The control server 100 is coupled to the resource servers 102, 104, 106 and 108 by way of one or more data links 110, 112, 114 and 116, which could be embodied using any appropriate media over which the commands to and responses from the resource servers can be carried and using an appropriate data communications protocol. Examples of the data links 110, 112, 114 and 116 include, but are not limited to, RF (radio frequency, such as a microwave link) one or more optical fibers or one or more metallic conductor.

In a preferred embodiment wherein the servers are used in a communications system, each resource server 102, 104, 106 and 108 shown in FIG. 1 can be linked to and control wireless or other communications equipment, such as an asynchronous transfer mode switch used to route Internet Protocol data packets, or a synchronous switching system, such as those used in the telephony network. In other embodiments mentioned above, the resource servers 102, 104, 106 and 108 perform other control and data processing functions, such as handling financial transactions at geographically dispersed automatic teller machines for a bank, handling travel reservations for a traveler on an airline, or other separate and/or disparate tasks in a mainframe computer or in a parallel processor. An important aspect of a preferred embodiment of the network insofar as it relates directly to the method disclosed herein is that any resource server 102, 104, 106 and 108 in the network can be assigned by the control server 100 to perform any task in the network. Stated alternatively, in the network 10 of FIG. 1, one resource server can control all or some of equipment coupled to every other server. Another important aspect of the network 10 is that the network makes no assumptions about the performance capacities of the resource servers 102, 104, 106 and 108; the resource servers may be identical or heterogeneous. In a communications system, each resource server 102, 104, 106 and 108 is directly or indirectly coupled to communications equipment, which among other things, provides network reliability through controller redundancy.

By way of example, resource server 102 could be assigned a control task for a telephone switching system (not shown) that any of the other resource servers 104, 106 and 108 could also perform because they too are coupled to the same switching system. In a network where all of the resource servers are able to handle all of a work load, it is important that the processing tasks assigned to the resource servers be allocated evenly or balanced, according to their load handling capacity. Inasmuch as the subject matter of this disclosure pertains to tie resolution between servers, additional discussion or specification of the structures and/or devices that might be controlled or operated by the resource servers 102, 104, 106 and 108 is omitted for purposes of brevity as well as simplicity.

At least one task of the network control sever 100 is the management or balancing of processing loads among several resource servers 102, 104, 106 and 108. By using methods of load balancing, such as those set forth in the applicant's co-pending patent applications, control server 100 attempts to balance the processing loads allocated to or carried by each resource server 102, 104, 106 and 108 so that a single resource server 102, 104, 106 and 108 does not have to carry more than it is capable of handling and thereby jeopardize the service level of the network. In a telecommunications network, a resource server's inability to process tasks assigned to it can result in telephone calls be lost, dropped, misdirected or delayed, all of which reduce the quality of service provided by the network.

In the course of balancing processing loads on each resource server 102, 104, 106 and 108 and resolving ties between resource servers, the control processor 100 monitors processing performance parameters sent to it by each of the resource servers that it controls. When the control processor 100 needs to assign an additional processing task, it will preferably attempt to assign a task to a server that is best suited to handle the additional task, however, when the control processor determines that two or more resource serves 102, 104, 106 and 108 are equally suited to be given an additional processing task, the control server 100 must thereafter resolve the "tie" between resource servers, which to say that the control server 100 is programmed to consider a resource server's performance factors to identify which resource server of many available servers should be given a new task when two or more of them appear to the control server to be equally suited for a new task.

Since the control server 100 is of course coupled to the resource servers via data links 110, 112, 114 and 116, the control server 100 is therefore able to send and receive messages to and from the resource servers. The messages received by the control server 100 from the resource servers 102, 104, 106 and 108 are referred to herein as status messages and are represented in FIG. 1 represented by the directed arrows identified by reference numerals 118, 120, 122 and 124.

Status messages 118, 120, 122 and 124 can be embodied using any appropriate data transmission protocol and can be transported or conveyed from the resource servers to the control server 100 a number of ways, by wired or wireless transmission. Status messages can be sent autonomously by the resource servers 102, 104, 106 and 108 on either a scheduled or non-scheduled basis. A control server 100 can poll a resource server for its status message by way of a polling message. A resource server can also upload one or more status messages by way of interrupt to the control server 100.

Although FIG. 1 shows status messages being sent directly to the control server 100 from the resource servers 102, 104, 106 and 108, those of ordinary skill in the art will recognize however that status messages can also be routed to a control server indirectly, such as from resource server 102 to resource server 106 and from there to the control server. Status messages can also be routed over any appropriate media or signaling network, such as the nearly ubiquitous SS7 signaling network. Regardless of how and when the status messages are received by the control server 100 and regardless of the pathway they traverse, as explained in greater detail below, the contents of the status messages convey to the control server 100, certain data processing parameters and characteristics of the resource servers 102, 104, 106 and 108 by which the control server 100 is better able to identify which resource server of many should be assigned new or additional processing tasks so that the network 10 quality of service (QoS) can be maintained at the highest possible level.

FIG. 1 depicts a first resource server 102 sending a status message 118 to the control server 102. A second resource server 108 is also depicted as sending another status message 120 to the control server 100. In the course of maintaining load balance, the control server 100 will often need to resolve a tie between resource servers in the network 10 as to which resource server should be assigned an additional network processing load, status messages from the resource serves 102, 104, 106 and 108 inform the control server about certain operational or data processing capabilities or characteristics of each resource server.

The data processing parameters sent to the control server 100 by each resource server and which are used by the control server to resolve a resource server tie, include but are not limited to: each server's current state (normal load or overload) and the resource server's "call gap percentage" in its current load state (0% call gapping under "normal load" conditions, with call gapping % increasing as overload states worsen); each resource server's next overload state (if available) and the "call gap percentage" in its next overload state, if available and finally, each resource server's previous overload state and the "call gap percentage" of each resource server when it was in its previous overload state, if available. As noted above, the concepts of "call gapping" and "overload" are explained in the above-identified co-pending U.S. patent applications. Note that a resource server in its normal load state will not have a "previous load" condition or state nor should it be gapping calls when it's in a normal load state. Similarly, a resource server in its most severe overload state will not have a "next" overload state. Notwithstanding the fact that a resource server in its "normal" load state does not gap calls, in the preferred embodiment, resource servers in their normal load state preferably still report call gapping percentage to the control server, albeit as zero percent. Note too however that in an alternate embodiment, the reporting of a resource server in its normal state can cause the control server to assume that such a resource server is not gapping calls.

Table 1 below lists the data processing parameters that are sent to the control server 100 by each resource server. In practicing the method of tie resolution disclosed and claimed herein, it is not necessary that the data processing parameters listed in Table 1 be sent upwardly to the control server 100 at the same time, i.e., in a single message. In order to resolve a tie between resource servers, it is only necessary that the control server 100 receive the parameters in Table 1 so that they can be considered. Therefore, the parameters listed in Table 1 can be sent to the control server in a single status message as well as in multiple messages.

TABLE 1

Current Load State Indication (Normal or stages of overload)
Call gapping % in current load state
Previous load stage, if available
Call gapping % in previous load stage, if available
Next load stage, if available
Call gapping % in next load stage, if available
Server load state in its current load state continuum As can be seen in Table 1, data sent to the control server 100 in one or more of the status messages 126, 128, 130 and 132 specify a resource server's current load state and its current call gap percentage. As stated above, a resource server in a normal load state will have a call gap percentage of zero percent, which should nevertheless be reported to the control server as such. The data sent to the control server also includes a resource server's previous load state and call gap percentage while in the previous load state, if there exists a previous stage for the server. Finally, the data sent to the control server also includes the resource server's next overload state and the call gap percentage that the resource server will have in the next overload state, unless the server is already in its most severe overload condition, in which case there would be no further state information.

In some alternate network embodiments, a control server 100 may be sufficiently robust to be able to be programmed so that it is both a control server and a resource server. In such a network embodiment, the control server 100 would presumably already have the data processing parameters listed in Table 1 readily available to it, which are used in the method of tie resolution disclosed herein. In such a control server, the portion of the server or its software that receives, uses or which accesses data processing parameters indicative of its state(s) and gapping would still be considered to have received such parameters in a "status message" perhaps in a different form and/or method than the status messages used by the other resource servers. For purposes of clarity and simplicity of the method described hereinafter, it is assumed herein that the control server 100 shown in FIG. 1 is not a resource server as well.

When trying to balance loading amongst resource servers 102, 104, 106 and 108 so as to maintain network 10 at an optimum, if the control server 100 determines that two or more resource servers appear to be equally able to assume an additional processing load, a method 200 of resolving a tie between two or more servers includes the steps best explained with the aid of FIG. 2, which is a chart showing one implementation of the preferred embodiment of a method of resolving a tie between two or more resource servers by a control server.

The method of tie resolution 200 between resource servers begins at state/step 202, which shows that the control server 100 acquires information on an as needed basis. In step 202, for every available, i.e., in-service, resource server 102, 104, 106 and 108, the control server 100 obtains from each resource server via one or more "status messages" a set of parameters that are indicative of a processor's past, current and future ability to process tasks for the network 10/control server 100. One or more status messages to the control server 100 convey each resource server's current state, namely whether a server is operating in a "normal" or overloaded state. For resource servers in an overloaded state, the control server also acquires the resource server's current call gap percentage; if available, each resource server's previous overload state and call gap percentage in the previous overload state; and if available, each resource server's next or future overload state and the resource server's call gap percentage in the next or future overload states. In addition, the resource server 100 determines or is otherwise informed of (by the resource servers) where each resource server is in the continuum of an overload state. Stated alternatively, each resource server 102, 104, 106 and 108 provides or is interrogated as to whether it is at or near the beginning of its current overload state; near or in the middle of an overload state or whether it is near or proximate the end of an overload state.

Inasmuch as overload states are determined by the amount of processing load imposed on a resource server, once a resource server enters a particular overload state by the assignment of a processing task, the task that pushes a resource server into a particular overload state makes that server near or proximate to the "beginning" of the state. If a resource server has been in an overloaded state and/or is assigned more overloading tasks, when the server is just prior to the point or condition when the processor goes into a next higher overload state or condition is considered to be a point or condition when the resource server is at or near the "end" of an overload state. Between the beginning and end of overload states there is of course a mid-point or middle overload state.

The past, current and future overload states and the call gap percentages in those states and the determination of where in the continuum or an overload state that a resource server is, all of which are conveyed to the control server in one or more status messages are considered to be data handling parameters that are indicative of a resource server's past, current and future data processing capability.

After the resource servers' 102, 104, 106 and 108 data handling parameters are obtained by the control server 100 in step 202, the control server 100 goes into a wait loop at steps 204 and 206, wherein the control server 100 waits for a new processing task for the network, such as a new telephone call to be routed. When a new processing task occurs or arrives, using the data handling parameters it obtained from the resource servers, using the data sent to it in the status messages, the control server 100 determines in step 208 whether any of the available (i.e., in-service) resource servers are "not gapping." In other words, the control processor 100 first determines if any of the servers are not in an overload state and therefore able to handle an additional processing task in a non-overloaded state.

As shown in step 210, if there is at least one resource server 102, 104, 106 or 108 that is not in an overload state, the method proceeds to step 212 (on FIG. 2B) where a determination is made as to whether one of the not-overloaded resource servers is least loaded. If there is a resource server having fewer tasks or being less loaded than the other resource servers, the method assigns the most recent task to that server with the method returning to step 204 on FIG. 2A, i.e., the wait loop, until a new processing task arrives.

As shown at step 212, if there is no one resource server with less processing load than all of the others that are not overloaded, at step 213, the method is to choose one of the resource servers randomly. After a resource server is chosen randomly in step 213, control returns to step 204, i.e., the wait loop, until another processing task arrives.

Returning to FIG. 2A, if at step 208 the control server determines that there are no resource servers that are not gapping, i.e., all of the resource servers are in overloaded states, at step 214 a determination is made as to whether of all the overloaded resource servers, there is one particular resource server that is gapping calls at the lowest rate or percentage of all resource servers. If there is one such resource server that is gapping calls at the lowest rate, the method proceeds to step 215 as shown in FIG. 2B where the control server 100 sends the processing task to the resource server gapping at the lowest rate. Again, the method then returns to the wait loop at step 204 on FIG. 2A for another processing task to occur.

If at step 214 the control server 100 determines that there is no one server with the smallest call gap rate or percentage in its current load state, the control server 100 then determines in step 216 whether the call gapping resource servers at the beginning of their overload states. If there are resource servers near the beginning of their overload states, a determination is made at step 217 in FIG. 2B whether any of the resource servers at the beginning of their overload states have a "highest" call gap percentage in its previous overload state. If amongst all the resource servers that are overloaded and at the beginning of an overload state, there is a single resource server having the highest call gap percentage in previous overload state, then it necessarily follows that all of the other resource servers have lower call gap percentages in their previous overload states. It also follows that for overall network performance optimization, when the servers are at or near the beginning of an overload state, the servers that gap fewer calls should be allowed to fall back to such states as quickly as possible. Therefore, a new processing task should be assigned to the resource server having the highest call gap percentage in its previous overload state so that other servers can fall back to their respective previous overload states and thereafter process more calls with less gapping or without any gapping than would otherwise be possible if one of them is assigned another processing task.

If at step 217 it turns out that there is more than one resource server with the same "highest" call gap percentage in their previous overload states, the method is to then randomly select one of those servers in step 219 as it makes no difference which of them receives the new task. Control again returns to step 204 on in FIG. 2A where the control server 100 waits for another processing task to be assigned.

Figure 2A:
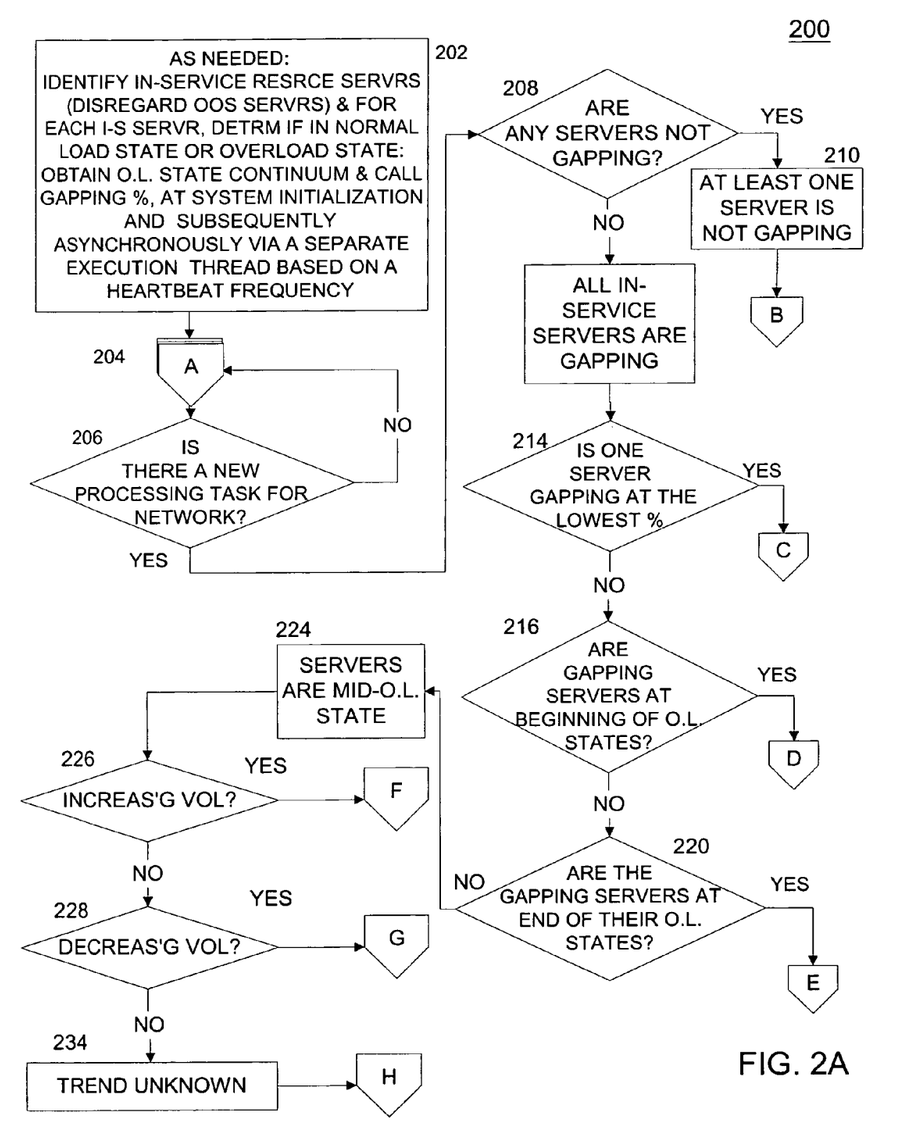
FIG. 2 is a flow chart, showing the steps of a method to resolve a tie in the selection of a resource server.
Figure 2B:
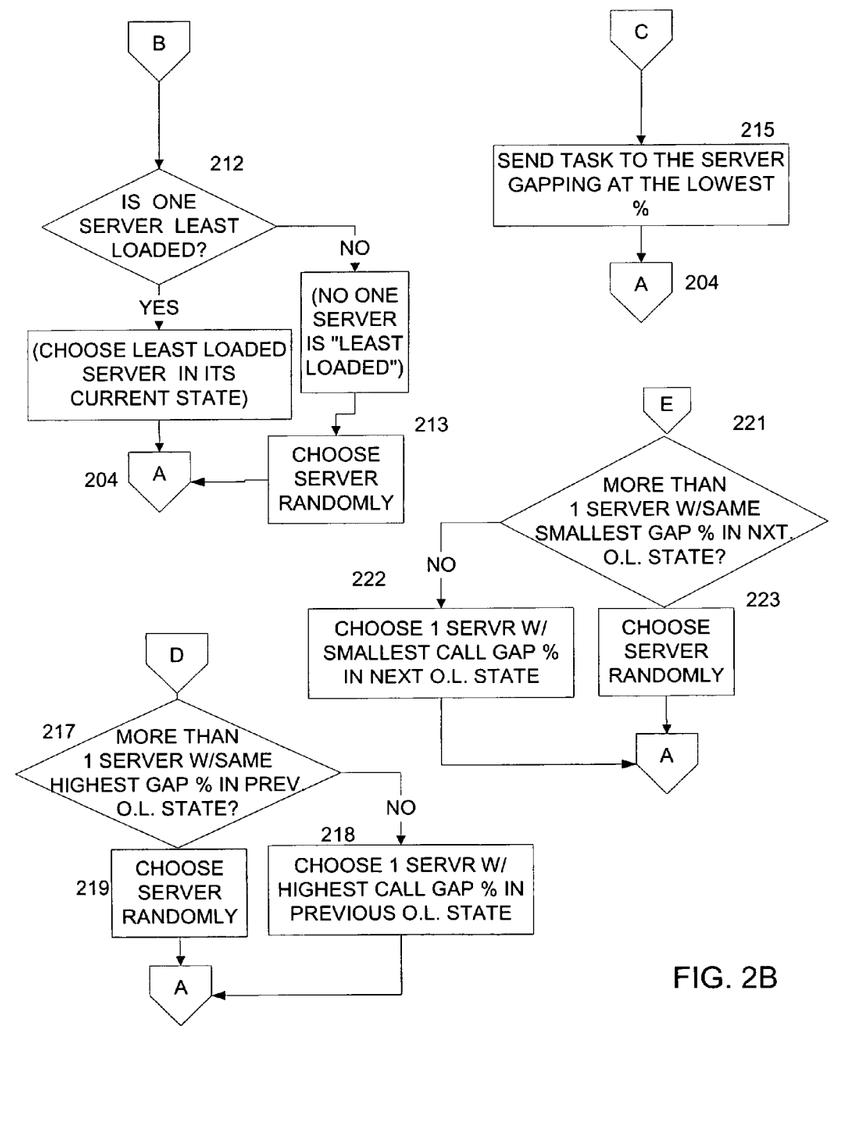

Still referring to FIG. 2A, if the overloaded and "gapping" resource servers are not at the beginning of their overload states, a second test is made at step 220 whether the resource servers are at the end of their overload states. If the resource servers are the end of their overload states, a determination is made at step 221 on FIG. 2B whether there is more than one resource server with the same "smallest" call gap percentage in its next overloaded state and if there are more than one such servers, one of them is chosen at random in step 223. If there is only one resource server with a "smallest" call gap percentage in its next overload state, all of the other resource servers must therefore have higher call gap percentages in their next overloaded states. In order to maximize overall network performance, the other servers that will gap calls at higher percentages should not be assigned a processing task. Rather, in step 222, the resource server with the smallest or lowest call gap percentage in its next overload state is assigned the most recently-arrived processing task.

Finally, it might turn out that the resource servers are at or near the middle of the continuum of their overload states, which is depicted in FIG. 2A at step 224. (The test of step 220 failed.) If the resource servers are in the middle of their overload states determinations are made in steps 226 and 228 whether call volume is increasing or decreasing.

Figure 2C:
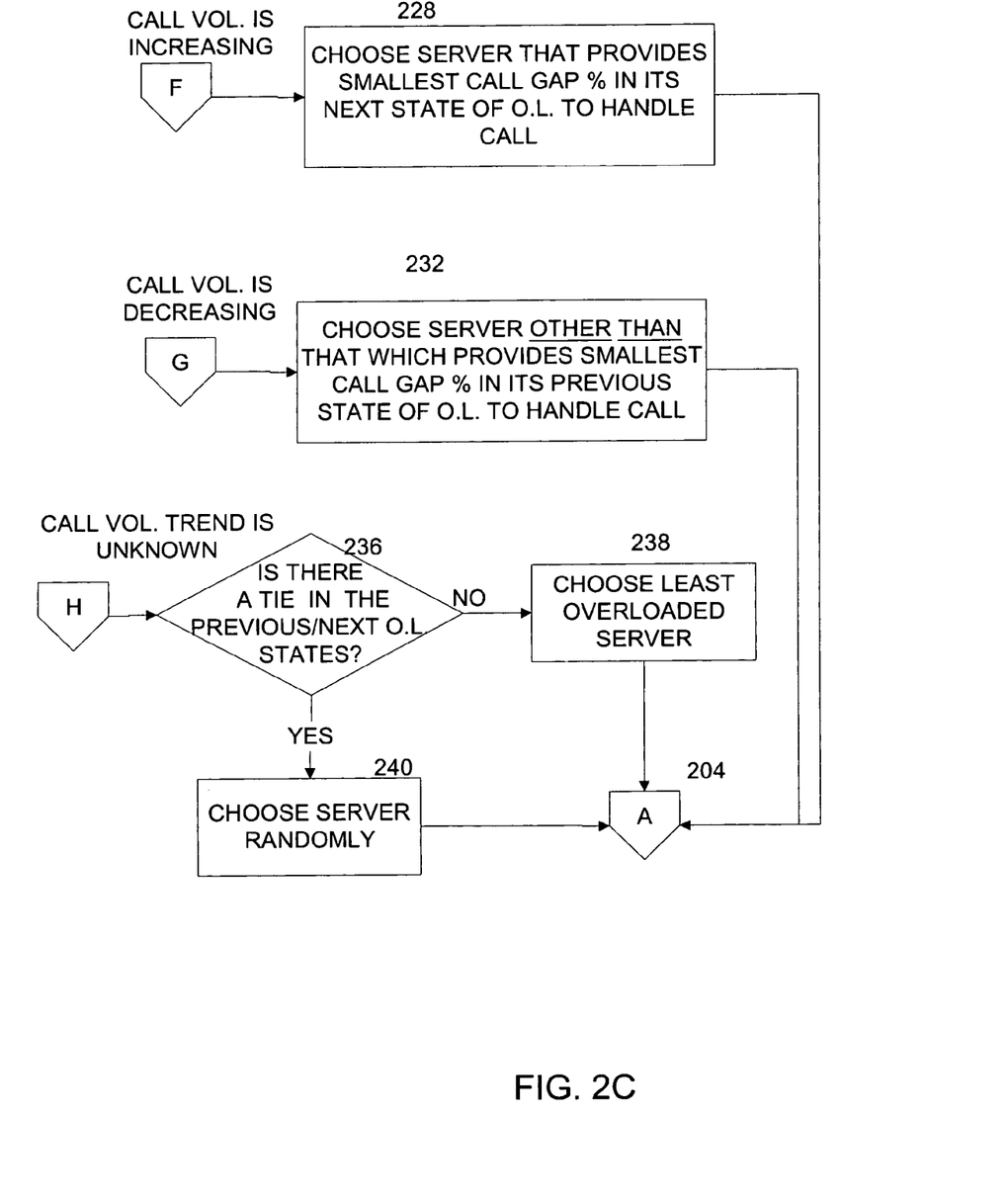

As shown in step 226, if the resource servers are at or near the middle of their overload states and call volume is increasing, control proceeds to step 227 in FIG. 2C, whereat the control server 100 should choose a resource server that provides the smallest call gap percentage in its next overload state so as to not assign a processing task to another server that will gap more calls when it goes to its next overload state.

As shown in step 228, if the resource servers are at or near the middle of their overload states and call volume is decreasing, at step 232 the control server should choose a resource server other than one that provides a smaller call gap percentage in its previous state. The reason behind such a choice is that for overall network performance optimization, when call volume through the network is decreasing, all of the resource servers of the network can be anticipated to eventually fall back to lower overload states where they will gap correspondingly fewer calls. Therefore, to maximize overall network performance, when call volume is decreasing, a new processing task should be assigned to a less-efficient resource server in order to allow other more efficient resource servers to fall back to less-overload states where fewer calls will be gapped.

As shown in step 234, if the call volume trend is unknown, a determination is made at step 236 whether there is a tie in the call gapping in the next overload state of the servers. If there are no two servers with the same or substantially the same call gap percentage in their next overload state, the server that is least overloaded should be assigned the processing task as shown in step 238 in FIG. 2C, otherwise, a server should be chosen randomly as shown in FIG. 240.

It should be pointed out that the method steps depicted in FIG. 2A-2C show that the control server 100 acquires data handling parameters of the resource servers only once and thereafter waits for a new processing task. Over time and network 10 loading, the resource server operating conditions can change causing the data handling parameters to change as well. In an alternate embodiment, the resource serve 100 can acquire one or more of the data handling parameters periodically, aperiodically, or every time that new processing task arrives. What is important for the method of tie resolution is that data processing parameters disclosing the then-current state of the resource servers are available to the control server 100 when the control server needs to resolve a tie between two or more resource servers.

Figure 3:
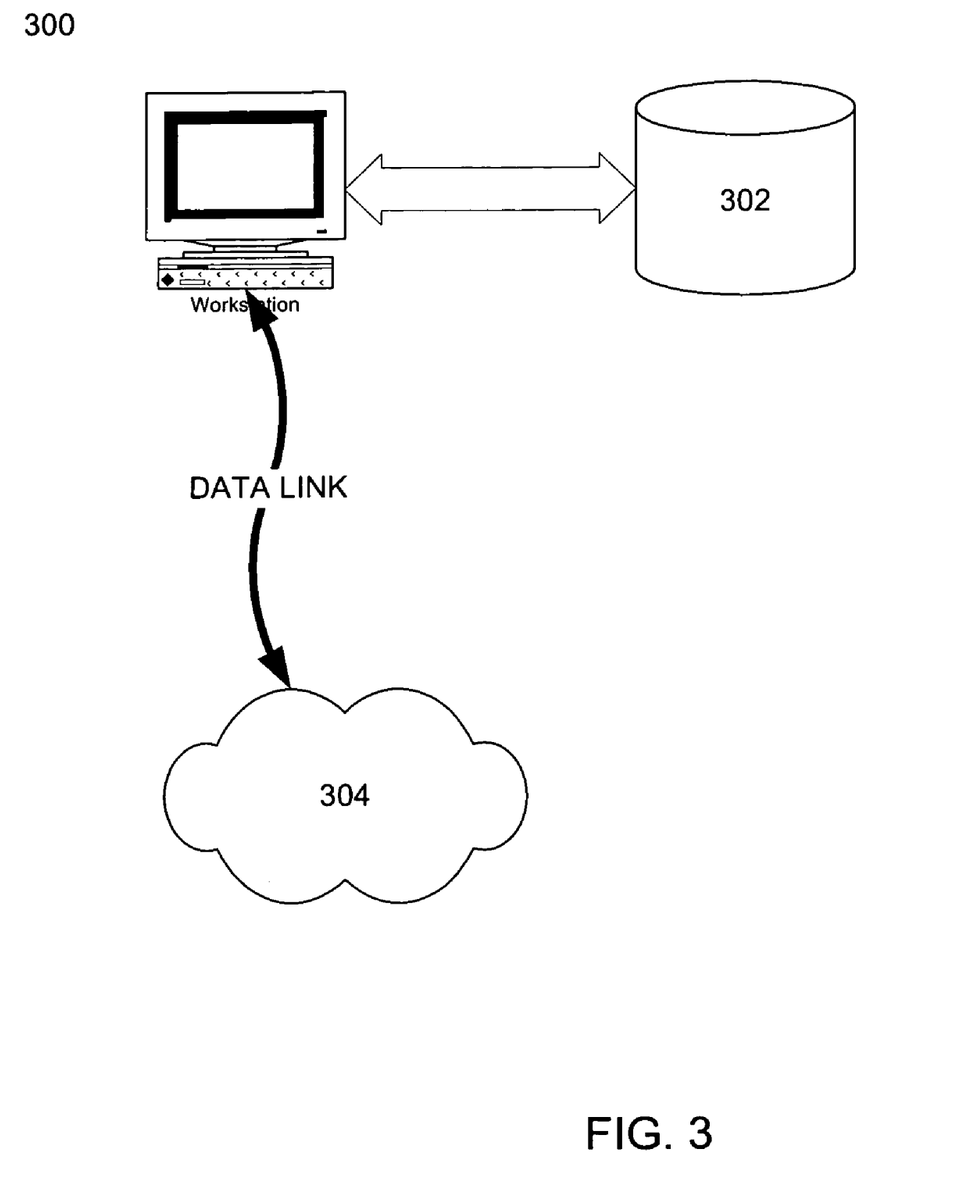
FIG. 3 is a generalized depiction of a server, including storage media where program instructions may be kept, which when executed by the processor or CPU of the server cause the server to perform the claimed steps of a method to resolve a tie between servers.

Those of ordinary skill in the art will recognize that each of the servers 100 and 102, 104, 106 and 108 discussed herein is embodied by one or more computers or CPUs and associated program storage media. For the sake of completeness, FIG. 3 shows a block diagram of a computer or processor 300, to which is coupled a storage device 302 and from which the computer 300 can read program instructions. The computer 300 executes the program instructions stored in the storage device 302 and it is the program instructions, which when executed will cause the computer or processor 300 to execute steps of the method described above. Of course, the program instructions for the resource servers and the control server will vary accordingly.

Well known embodiments of computer program storage media/devices 302 include magnetic disk, optical disk and semiconductor RAM, ROM, DRAM, EEPROM et al.

As shown in FIG. 3, the computer 300 is also coupled to a network via a radio link, metallic cable or wire or a fiber optic cable using data communication protocols well known in the art. Those of ordinary skill in the art will appreciate that while the status messages are readily passed via the nearly ubiquitous SS7 signaling network, the status messages as well as any other messages passing to or from any of the servers could take place over other networks using a variety of data transfer protocols. In the preferred embodiment, the control server 100 is a call controller for a cellular or other wireless communications network. The resource servers 102, 104, 106 and 108 are application servers.

The apparatus and method depicted in the figures are but examples of preferred embodiments of the invention claimed below. In particular, the steps or operations described herein are just examples. Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising
a control server that controls tasks that the control server assigns to a plurality of resource servers, wherein prior to assigning a task to a resource server, said control server:
receives a first status message comprising parameters that includes a call gap percentage of a next overload state of a first resource server and a previous overload state of the first resource server;
receives a second status message comprising parameters that includes a call gap percentage of a next overload state of a second resource server and a previous overload state of the second resource server; and
wherein the control server selects which of the first and second resource servers to send a task for processing by comparing the call gap percentage of the next overload state of the first resource server and the call gap percentage of the next overload state of the second resource server, and comparing the call gap percentage of the previous overload state of the first resource server and the call gap percentage of the previous overload state of the second resource server; and
the control server communicates the task to the selected resource server, wherein a call gap percentage is a percentage of call requests that are refused service.

2. The apparatus of claim 1, wherein the control server is a server that receives in said status messages, data that identifies a resource server's:
current state where a resource server's current state is one of overload and normal where if a resource server is in a normal call gap state then the current call gapping percentage is zero;
call gap percentage in the resource server's current load state;
the server's next overload state;
the resource server's call gap percentage in its next overload state; and
whether the resource server is at the beginning, middle or end of an overload state where the beginning of an overload state occurs when the resource server is near a next lower overload state and an end of an overload state occurs when the resource server is near a next higher overload state.

3. The apparatus of claim 1, wherein the control server receives said status messages one of periodically and aperiodically.

4. The apparatus of claim 1, wherein the first and second status messages further comprises a call gap percentage of a current overload state of the first and second resource servers, the control server determines if the first and second resource servers are not gapping calls in their current overload state, if the first and second resource servers are not gapping calls the control server communicates the task to one of the first and second resource servers based on which of the first and second resource servers is least loaded; and  if both the first and second resource servers are gapping calls the resource server determines which server is gapping calls at the lowest rate, and the resource server allocates the task to the resource server gapping calls at the lowest rate.

5. The apparatus of claim 1, wherein the control server assigns a plurality of tasks after receiving said first and second status messages once; and  the control server is a control server for an asynchronous transfer mode network.

6. The apparatus of claim 1, wherein the first and second status messages further comprises a call gap percentage of a current overload state of the first and second resource servers, the control server determines if the first and second resource servers are gapping calls, and if the first and second resource servers are gapping calls the control server allocates the task to one of the first and second resource server with a highest call gap percentage in a previous overload state.

7. The apparatus of claim 1, wherein the control server comprises a call controller of a cellular communication network and wherein the resource servers comprise application servers of the cellular communication network; and wherein the call controller is in at least one of: a banking network; an airline; a mainframe computer; a parallel processor.

8. The apparatus of claim 1, wherein the control server receives an indication of whether the first and second resource servers are at one of a beginning or end of an overload state where the beginning of an overload state occurs when a resource server is near a next lower overload state and an end of an overload state occurs when a resource server is near a next higher overload state; and  wherein the control server allocates the task to one of the first and second resource server based on whether the first server and the second server is at the beginning or end of an overload state, and based further on the current overload state call gap percentage of the first and second resource server, and based further on a determination of whether the call volume at the first and second resource server is at least one of increasing or decreasing.

9. An apparatus, comprising:

a resource server that processes an assigned task, said resource server sending at least one status message that comprises parameters that are indicative of:

the current normal state or current overload state of the resource server;

call gap percentages of at least the resource server's current overload state, next higher overload state, and previous overload state where a call gap percentage is a percentage of call requests that is refused service;

where the resource server is in the continuum of either its current state or overload state; and where the resource server is assigned a task based on of the resource server call gap percentage in the next higher overload state, call gap percentage in the previous overload state and the call gap percentage of the current overload state as compared to the call gap percentages of a next higher overload state, the call gap percentages of previous overload state and the call gap percentages of current overload state of at least one other resource server.

10. The apparatus of claim 9, wherein the resource server generates and communicates a status message that includes:

an indication of whether call volume at the resource server is increasing or decreasing; and an indication of whether a resource server is at the beginning, middle or end of an overload state where the beginning of an overload state occurs when the resource server is near a next lower overload state and an end of the overload state occurs when the resource server is near a next higher overload state.

11. The apparatus of claim 9, wherein the resource server is a server for an asynchronous transfer mode network; and  wherein the resource server comprises an application server of a cellular communication network.

12. The apparatus of claim 9, wherein the resource server is allocated the task further based on whether the call load on the resource server is increasing or decreasing.

13. The apparatus of claim 9, wherein the resource server comprises a server in at least one of: a banking network; an airline; a mainframe computer; a parallel processor.

14. The system of claim 9 wherein resource server is assigned a task based on whether the resource server is at the beginning of an overload state or an end of an overload state, where the beginning of an overload state occurs when the resource server is near a next higher overload state; and  the resource server is assigned the task based further on whether the call volume at the resource server is one of increasing or decreasing.

15. A method for a control server to resolve a tie between resource servers in a network of servers, said method configured to execute on said control server and comprising the steps of:

assigning by the control server, tasks to resource servers;

receiving, at the control server, a first status message comprising parameters that includes a call gap percentage of a next and a previous overload state of a first resource server;

receiving, at the control server, a second status message comprising parameters that includes a call gap percentage of a next and previous overload state of a second resource server;

selecting, by the control server, one of the first and second resource servers to send a task for processing by comparing the call gap percentage of the next overload state of the first resource server and the call gap percentage of the next overload state of the second resource server, and comparing the call gap percentage of the previous overload state of the first resource server and a call gap percentage of the previous overload state of the second resource server; and communicating, by the control server, the task to the selected resource server, wherein a call gap percentage is a percentage of call requests that are refused service.

16. The method of claim 15 further wherein the first and second status messages further comprise a call gap percentage of a current overload state of the first and second resource servers, the control server determines if the first and second resource servers are not gapping calls, if the first and second resource servers are not gapping calls the control server communicates the task to one of the first and second resource servers based on which of the first and second resource servers is least loaded; and if both the first and second resource servers are gapping calls the resource server determines which server is gapping calls at the lowest rate, and the resource server allocates the task to the task to the resource server gapping calls at the lowest rate.

17. The method of claim 15, wherein the first and second status messages further comprises a call gap percentage of a current overload state of the first and second resource servers, the control server determines if the first and second resource servers are gapping calls, and if the first and second resource servers are gapping calls the control server allocates the task to the one of the first and second resource servers with a highest call gap percentage in a previous overload state.

18. The method of claim 17, wherein, if both the first and second resource servers are gapping calls the resource server determines which server is gapping calls at the lowest rate, and the resource server allocates the task to the resource server gapping calls at the lowest rate.

19. The method of claim 15, wherein the control server receives an indication of whether the first and second resource servers are at one of a beginning or end of an overload state where the beginning of an overload state occurs when the resource server is near a next lower overload state and an end of an overload state occurs when the resource server is near a next higher overload state.

20. The method of claim 19 wherein the control server allocates the task to one of the first and second resource servers based on whether the first resource server and the second resource server is at the beginning or end of an overload state, and based further on the call gap percentage of the first and second resource server, and based further on a determination of whether the call volume at the first and second resource server is at least one of increasing or decreasing.

* * * * *